United States Patent
Wallacher

(10) Patent No.: US 7,480,630 B2
(45) Date of Patent: Jan. 20, 2009

(54) METHOD FOR ALLOCATING FINANCIAL VALUES ACROSS MULTIPLE ACCOUNTS USING PRECISE VALUES

(75) Inventor: Claus Wallacher, Belmont, CA (US)

(73) Assignee: SAP AG, Walldorf (DE)

( * ) Notice: Subject to any disclaimer, the term of this patent is extended or adjusted under 35 U.S.C. 154(b) by 924 days.

(21) Appl. No.: 10/860,010

(22) Filed: Jun. 4, 2004

(65) Prior Publication Data

US 2005/0273402 A1 Dec. 8, 2005

(51) Int. Cl.
*G06Q 40/00* (2006.01)
(52) U.S. Cl. .......................................... 705/35; 705/39
(58) Field of Classification Search ................ 705/35
See application file for complete search history.

(56) References Cited

U.S. PATENT DOCUMENTS 5,897,621 A * 4/1999 Boesch et al. ............... 705/26

OTHER PUBLICATIONS

Judge, Michael, "Office Space" 1999, 47:33.*

* cited by examiner

Primary Examiner—Kambiz Abdi
Assistant Examiner—Lindsay M. Maguire
(74) Attorney, Agent, or Firm—Kenyon & Kenyon LLP

(57) ABSTRACT

A method for allocating financial statement values across multiple accounts using precise values is provided. The method creates an n×m array of rounded allocation values, which are appropriately scaled according to share values for each account. According to one embodiment of the present invention, the method generates rounded allocation values by working across a given line item, account by account, then to a next line item. The method first calculates a relative portion of a respective line item value to be apportioned to accounts 1 to j for a given account j. The method then rounds the calculated portion according to a predetermined degree of precision. Finally, the method calculates a portion applicable to account j as a difference between the calculated portion and a portion calculated for a previous account j-1. The method repeats these steps for each account from a first account to a last account, then each line items from the first line item to the last line item in the financial statement.

12 Claims, 5 Drawing Sheets

METHOD FOR ALLOCATING FINANCIAL VALUES ACROSS MULTIPLE ACCOUNTS USING PRECISE VALUES

BACKGROUND

Embodiments of the present invention relate to methods for balancing financial documents, and more particularly, to methods for allocating financial values across multiple accounts using precise values.

In computerized financial management systems, or accounting systems, whenever there is a need to perform any calculation on monetary amounts, rounding errors become a big issue. This is because all currency has a limited degree of precision on monetary values. For example, the US dollars can only be calculated down to one cent but not to a fraction of a cent. Accordingly, the computerized financial management systems represents all monetary values and performs all calculations only to the limited degree of precision. Thus, rounding errors, especially with small numbers, are unavoidable. Financial documents are the primary examples where rounding errors become critical. In order to keep the accuracy of the financial balance sheets, each financial document that is included on the balance sheet must balance to zero. In addition, any amount in the original document must be exactly accounted for in the modified document.

Sometimes, values from a financial balance sheet, which keeps track of money coming in and going out, must be allocated across a plurality of different accounts—i.e., different projects, different organizations, different documents, and the like. Allocations between accounts may be expressed in terms of percentages or shares. For example, suppose A pays vendor B 100 USD out of A's bank account. The financial document may show −100 USD as a first line item for A's bank account and +100 USD against A's vendor account. If the 100 USD A paid to B is apportioned to budgets for three projects (Project 1, Project 2, and Project 3), A must split this 100 USD among three different accounts in A's internal books. The following table illustrates a typical financial document having line item values is allocated across a plurality of accounts:

TABLE 1

| | Line Item Value | Account 1 | Account 2 | ... | Account n |
|---|---|---|---|---|---|
| Line Item 1 | $a_1$ | $a_1 \cdot \frac{x_1}{x}$ | $a_1 \cdot \frac{x_2}{x}$ | ... | $a_1 \cdot \frac{x_n}{x}$ |
| Line Item 2 | $a_2$ | $a_2 \cdot \frac{x_1}{x}$ | $a_2 \cdot \frac{x_2}{x}$ | ... | $a_2 \cdot \frac{x_n}{x}$ |
| ... | ... | ... | ... | ... | ... |
| Line Item m | $a_m$ | $a_m \cdot \frac{x_1}{x}$ | $a_m \cdot \frac{x_2}{x}$ | ... | $a_m \cdot \frac{x_n}{x}$ | where $x_1$, $x_2$, and $x_3$ represent respective share allocations and x represents a sum of all shares outstanding $$\left(\sum_{i=1}^{3} x_i\right),$$

and $a_1$-$a_m$ represents a different line item values. To be a balanced document, the line item values $a_1$-$a_m$ must sum to zero.

In Table 1, each cell contains a value representing how much of a given line item belongs to a particular account. Thus, the value of cell (i=1, j=1) may be the amount of line item 1 multiplied by the ratio of account 1's share and the total number of shares $$\left(a_1 \cdot \frac{x_1}{x}\right).$$

For consistency purposes, the sum of all cell values on a given row $$\left(\text{i.e., } a_1 = a_1 \cdot \frac{x_1}{x} + a_1 \cdot \frac{x_2}{x} + \ldots + a_1 \cdot \frac{x_n}{x}\right)$$

must equal the amount of a line item represented in that row. Additionally, to remain in balance, the sum of all line items within one column must be zero $$\left(0 = a_1 \cdot \frac{x_1}{x} + a_2 \cdot \frac{x_1}{x} + \ldots + a_m \cdot \frac{x_1}{x}\right).$$

In the following, we use the notation $a_{ij}$ for the values $$a_i \cdot \frac{x_j}{x}.$$

With monetary values, the individual values must be rounded to a limited degree of precision on the monetary values. Such calculations, however, may result in rounding errors. Suppose Line Item 1 with a total amount of 100 USD to be allocated among three projects in equal shares. This will result in the following table:

TABLE 2

| In US $ | $a_i$ | Proj 1 | Proj 2 | Proj 3 |
|---|---|---|---|---|
| Line item 1 | 100 | 33.33 | 33.33 | 33.33 |
| Line item 2 | 100 | 33.33 | ... | ... |
| Line item 3 | −200 | −66.67 | ... | ... |

Each share of Line item 1 is rounded to 33.33 USD, but the sum of these three shares do not add up to the total amount of Line Item 1, which is 100 USD. While these individual rounding errors may seem small at first glance, for organizations like government agencies, banks, and/or any other financial institutions, these rounding errors may be critical.

Accordingly, there is need in the art for a method that reduces these rounding errors and provides accurate calculations of monetary values when allocating financial statement values across two or more accounts.

DETAILED DESCRIPTION

Figure 1:
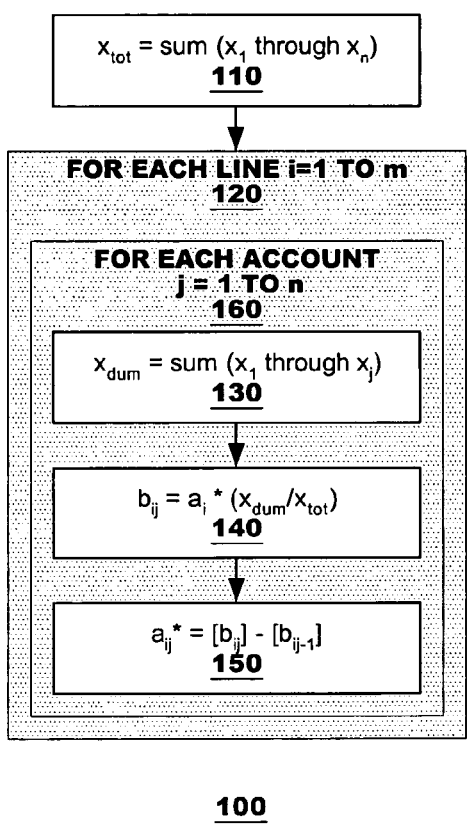
FIG. 1 illustrates a method for allocating financial statement values across multiple accounts using precise values according to an embodiment of the presentation.

Embodiments of the present invention provide various methods for allocating financial statement values across multiple accounts using precise values. One embodiment of the present invention provides a method that creates an n×m array of cells where there are n line items and m accounts. Each cell contains an allocation value that represents a portion of a line item value appropriately scaled according to a predetermined share of an account. The method may then determine a rounded allocation value for each allocation value and may adjust some of the rounded allocation values with respect to other rounded allocation values to provide an accurate financial balance sheet. Embodiments of the present invention may find particular application in systems that perform balancing of a plurality of related financial documents.

To ensure the accuracy of the overall financial balance sheet, embodiments of the present invention provide methods that satisfy various of the following objectives:

Objective 1: No amounts are lost after the allocation of the original financial document, (e.g., the sum of each and every rounded value for a line item equals the total amount of the line item before the values were rounded $(a_{i1}^* + \ldots + a_{in}^* = a_i$ for $i=1, \ldots, m$, where m is the total number of line items of the document));

Objective 2: Each account remains balanced, (e.g., the sum of the rounded values of all line items apportioned for an account equals to zero $a_{1j}^* + \ldots + a_{mj}^* = 0$ for $j=1, \ldots, n$, where n is the number of accounts the original document needs to be split into));

Objective 3: If a document were canceled, the allocated values of the canceled document are the exact mirror images of the allocated values of the original document, (e.g., if a second document is a canceled document, or $a_i = -a_i$, then $a_{ij}^* = -a_{ij}^*$ for $i=1, \ldots, m$ and $j=1, \ldots, n$); and/or Objective 4: No alteration is performed for values that can be represented precisely (e.g., if $a_{ij} \in Z_{ij}$ for $i=1, \ldots, m$ and $j=1, \ldots, n$, then $a_{ij}^* = a_{ij}$).

With respect to the Objective 4 and throughout the description of embodiments provided herein, all numbers representing a financial amount may be represented as an integer number (a number in Z). For example, 3333 cents (integer value representation=Z) may be used instead of 33.33 USD (rational value representation=Q).

The description herein uses the following labeling conventions:

Line Item(s): $a_1, \ldots, a_m$, where $a_1, \ldots a_m \in Z$ and $a_1 + \ldots + a_m = 0$ (accordin to embodiments of the present invention, methods may perform monetary value calculations based on an assumption that all monetary values do not have a fraction portion); and Share of each account: $x_1, \ldots, x_n$, where $x_1, \ldots, x_n \in Q$ and $x_1 + \ldots + x_n x$, where x is the total number of shares.

When these two inputs are received, embodiments of the present invention may determine a rounded allocation value $a_{ij}^*$ to satisfy one or more of the above mentioned Objectives.

Additionally, embodiments of the present invention may use a rounded value [x] throughout the description provided herein. The rounded value [x] is defined as follows:

$$[x] = \text{sign}(x) * r(|x|),$$

wherein $r(x) = \lfloor x \rfloor$ for $x - \lfloor x \rfloor < \frac{1}{2}$, or
$\lceil x \rceil$ otherwise.
($\lfloor x \rfloor$ denotes the largest integer smaller or equal to x and $\lceil x \rceil$ denotes the smallest integer larger or equal to x).

That is, to determine the rounding value [x], the absolute value of x must be rounded and then the sign of x is multiplied thereto. For example, the rounded value of 1.5, or [1.5], would be 2 and the rounded value of −1.5, or [−1.5], would be −2. The rounded value of 1.4, or [1.4], would be 1 and the rounded value of −1.4, or [−1.4], would be −1.

FIG. 1 illustrates a method 100 of operation according to an embodiment of the present invention, for allocating a set of line item values $(a_1 - a_m)$ from a financial document across n accounts. The method 100 creates an n×m array of rounded allocation values $(a^*_{ij})$, which are appropriately scaled according to share values for each account $(x_1 - x_n)$. The rounded allocation values satisfy the Objective 1 that the values sum up to the value of the line item entry $(\Sigma a_{ij}^* = a_i (j=1$ to n)); the Objective 3 that the rounded version of the canceled document is the exact mirror image of the rounded version of the original document $(\alpha_{ij}^* = -\alpha_{ij}^*)$; and the Objective 4 that no alteration is performed whenever precise allocations are possible. The method 100 generates the rounded allocation values by calculating rounded values for each entry within a line item, then advancing to a next line item and calculating rounded value for entries therein.

When the method 100 begins, it may determine a total number of shares, $x_{tot}$, by adding the number of shares for each and every account (box 110). The total number of shares, $x_{tot}$, may be determined using the following equation:

$$x_{tot} = \Sigma [x_1 \text{ through } x_n]. \tag{1}$$

The method 100 may generate rounded allocation values by working across a given line item, account by account, then advancing to a next line item. At a given line item i, account j, the method 100 may generate a dummy value $(x_{dum})$ representing a total number of shares allocated to accounts 1-j $(x_{dum} = \Sigma[x_1 \text{ through } x_j])$ (box 130). The method 100 may then determine a relative portion $(b_{ij})$ of the present line item value $a_1$ that should be apportioned to accounts 1-j (box 140). The value $b_{ij}$ may be calculated on a straightforward relative share basis:

$$b_{ij} = a_i * (x_{dum}/x_{tot}). \tag{2}$$

The rounded allocation value $a_{ij}^*$ of the present cell (i,j) may be calculated as a difference between the rounded values of the portions calculated for the present cell and the immediately preceding cell (i,j-1):

$$a_{ij}^* = [b_{ij}] - [b_{ij-1}] \tag{3}$$

(box 150).

The method 100 may be repeated for every account of the line item i. When operation reaches the last account (account n), the dummy value $x_{dum}$ will equal $x_{tot}$ and, therefore, $b_{ij}$ will equal $a_i$. The rounded allocation value of the last entry in the array will guarantee that the sum of all rounded allocation values in the line of the array will equal $a_i$ by virtue of equation (3).

Once operation concludes for the line item, operation may reset and advance to the next line for further processing. In this way, the method 100 serially calculates rounded allocation values for every entry in the array.

A representative example is set forth below to better illustrate the method 100 according to an embodiment of the present invention. Consider the following inputs:

$a_1, \ldots, a_5 = 99, 99, -400, 100, 102$; and $x_1, \ldots, x_3 = \frac{1}{3}, \frac{1}{4}, \frac{5}{12}$.

The exact calculation of these input data would return the following balance sheet:

TABLE 3

| $a_{ij}$: | | | $a_I$ |
|---|---|---|---|
| 33 | 24.75 | 41.25 | 99 |
| 33 | 24.75 | 41.25 | 99 |
| −133 · ⅓ | −100 | −166 · ⅔ | −400 |
| 33 · ⅓ | 25 | 41 · ⅔ | 100 |
| 34 | 25.5 | 42.5 | 102 |

When the method 100 is used, the rounded values of $b_{ij}$ ([$b_{ij}$]) may return the following results:

TABLE 4

| [$b_{ij}$] | | |
|---|---|---|
| 33 | 58 | 99 |
| 33 | 58 | 99 |
| −133 | −233 | −400 |
| 33 | 58 | 100 |
| 34 | 60 | 102 |

These [$b_{ij}$] values may result in the following rounded allocation values $a_{ij}^*$:

TABLE 5

| $a_{ij}^*$: | | |
|---|---|---|
| 33 | 25 | 41 |
| 33 | 25 | 41 |
| −133 | −100 | −167 |
| 33 | 25 | 42 |
| 34 | 26 | 42 |

As shown in Table 5, the sum of rounded allocation values in the second column does not equal zero. Thus, the method 100 does not always satisfy the Objective 2.

Figure 2:
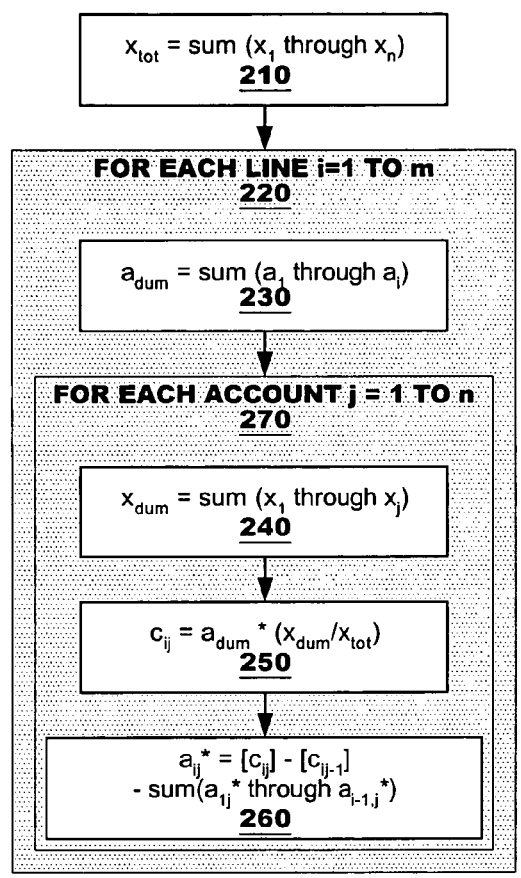
FIG. 2 illustrates another method for allocating financial statement values across multiple accounts using precise values according to an embodiment of the present invention.

FIG. 2 illustrates a second method 200 of operation for allocating a set of line item values ($a_1$-$a_m$) from a financial document across n accounts according to a second embodiment of the presentation. The method 200 creates an n×m array of rounded allocation values ($a_{ij}^*$) that satisfy the Objective 1-3. The values will sum up to the value of the line item entry ($\Sigma a_{ij}^* = a_i$ (1=1 to n)). The values for each account will sum to zero (($\Sigma a_{ij}^* = 0 (i=1$ to m)). If a document were canceled, the allocated values of the canceled document are the exact mirror images of the allocated values of the original document ($\alpha_{ij}^* = -a_{ij}^*$). The method 200 generates the rounded allocation values by calculating rounded values for each entry as a portion of the total line item values.

At the start, the method 200 may determine a total number of shares, $x_{tot}$, by adding the number of shares for each account in a line item using equation (1) (box 210). The method 200 may generate rounded allocation values by working across a given line item, account by account, then to a next line item (boxes 220 and 270). For a given line item i, the method 200 may determine a dummy value ($a_{dum}$) representing a running total of line item values for line items 1 through i ($a_{dum} = \Sigma[a_1$ through $a_i]$) (box 230). The method 200 may then work account by account for the line item i. Thus, at a given line i, account j, the method 200 may determine $x_{dum}$ representing the total number of shares allocated to accounts 1-j ($x_{dum} = \Sigma[x_1$ through $x_j]$) (box 240). The method 200 may then determine a relative portion ($c_{ij}$) of the dummy value $a_{dum}$ that should be apportioned to accounts i-j. (box 250). The $c_{ij}$ may be determined using the following equation:

$$c_{ij} = a_{dum} * (x_{dum}/x_{tot}). \tag{4}$$

The rounded allocation value $a_{ij}^*$ for the present cell (i,j) may be calculated as a difference between the rounded value of the portions calculated for the present cell and the immediately preceding cell (i, j-1) minus the sum of rounded allocation values $a_{ij}^*$ determined for cells (1,j) through (i-1, j):

$$a_{ij}^* = [c_{ij}] - [c_{ij}-1] - \Sigma[a_{1j}^* \text{ through } a_{i-1j}^*]. \tag{5}$$

(box 260).

The method 200 may be repeated for every account of the line item i. When the operation reaches the last line item (line item m), $a_{dum}$ will equal to zero because the financial balance sheet must balance to zero. The rounded allocation value of the last line item will guarantee that the sum of all rounded allocation values for a given account will equal to zero by virtue of equation (5). When the operation concludes for the line item i, the method 200 advances to the next line for further processing. In this way, the method 200 serially calculates rounded allocation values for every entry in the array.

For example, consider the example given in paragraph [22]. If the method 200 is used, the rounded value of the portion $c_{ij}$ ([$c_{ij}$]) may return the following results:

TABLE 6

| [$c_{ij}$] | | |
|---|---|---|
| 33 | 58 | 99 |
| 66 | 116 | 198 |
| −67 | −118 | −202 |
| 34 | 60 | −102 |
| 0 | 0 | 0 |

These [$c_{ij}$] values may return the following rounded allocation values, $a_{ij}^*1$:

TABLE 7

| $a_{ij}^*$: | | |
|---|---|---|
| 33 | 25 | 41 |
| 33 | 25 | 41 |
| −133 | −101 | −166 |
| 33 | 25 | 42 |
| 34 | 26 | 42 |

As shown in Table 7, the rounded allocation value for the cell (3,2) does not equal the original value of the cell. Thus, the method 200 may not always satisfy the Objective 4.

Figure 3:
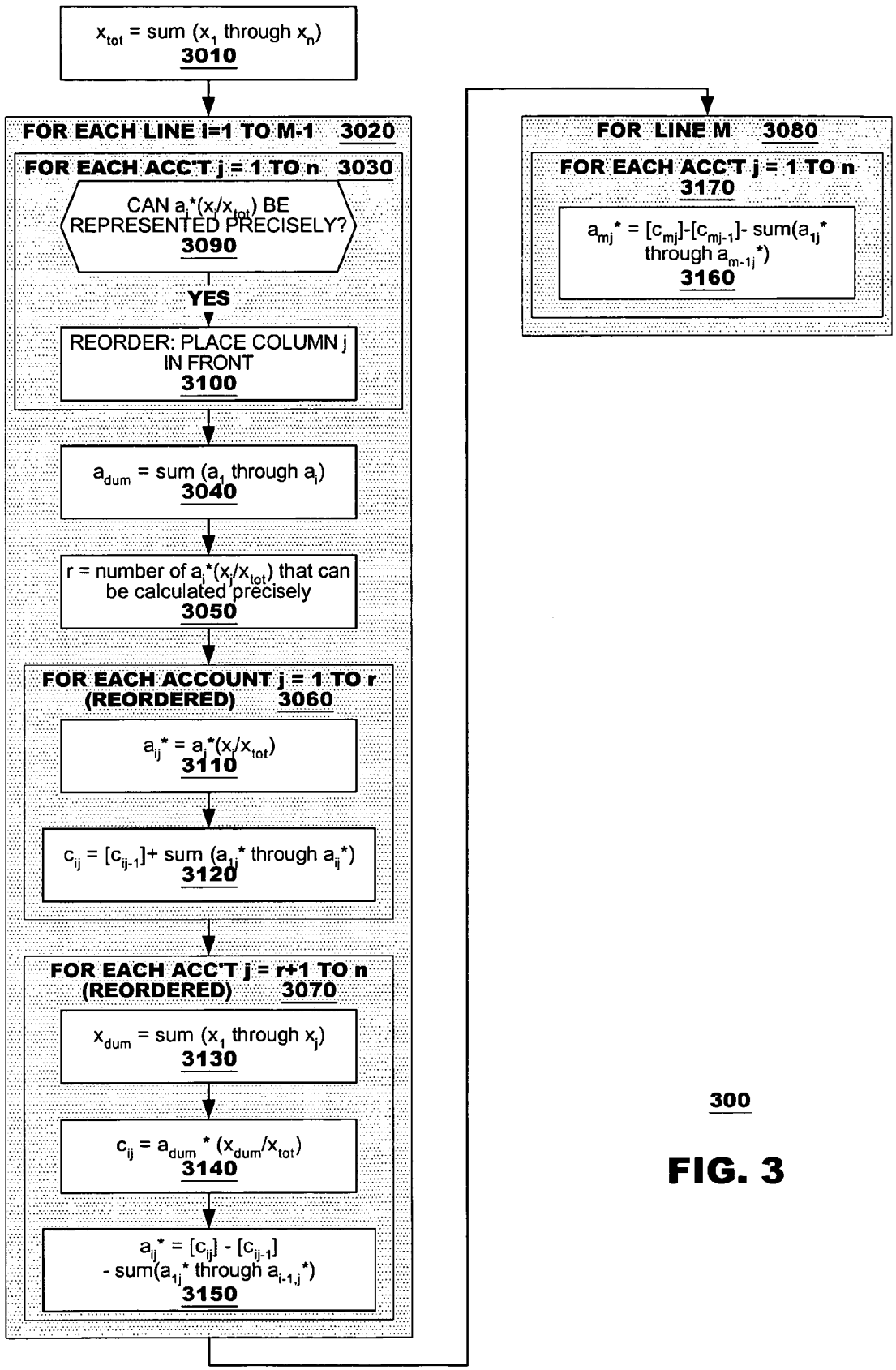
FIG. 3 illustrates yet another method for allocating financial statement values across multiple accounts using precise values according to an embodiment of the invention.

FIG. 3 illustrates a third method 3000 for allocating a set of line item values from a financial document across n accounts according to a third embodiment of the present invention. The method 3000 creates an n×m array of rounded allocation values ($a_{ij}^*$) that satisfy the Objectives 1-3. The method 3000 generates rounded allocation values by breaking down the allocation values into three groups: a first group for the allocation values that can be represented precisely, a second group for the allocation values that cannot be represented precisely, and a third group for the allocation values in the last line item m. For each group of allocation values, a different method is used to calculate the rounded allocation values.

When the method 3000 begins, it may determine a total number of shares, $x_{tot}$, by adding the number of shares for each and every account of a line item (box 3010). The method 3000 may generate rounded allocation values by working across a given line item, account by account, then advance to a next line item. At a given line i, account j, the method 3000 may then determine whether the allocation value may be represented precisely (box 3090) by determining if $a_i^*(x_j/x_{tot})$ returns an integer value. If so, the method 3000 may reorder the accounts of the given line array by (1) placing the account j in the first column of the given line array and (2) moving the rest of the accounts of the line array one column to the right (box 3100). The method 3000 may then determine $a_{dum}$, a running total of line item values for line items 1 through i ($a_{dum} = \Sigma[a_1$ through $a_i]$) (box 3040). The method 3000 may also determine the number of allocation values that can be represented precisely in the line array, r (box 3050).

At a given line item i, for accounts 1 through r (cells with allocation values that can be represented precisely), the method 3000 may determine a rounded allocation value $a_{ij}^*$, which is equal to the exact amount, by multiplying the given line item value by the ratio of the account share and the total number of shares ($a_i^*(x_j/x_{tot})$) (box 3110). The method 3000 may determine a relative portion ($c_{ij}$) of the total line item values that should be apportioned to line items 1-i and accounts 1-j (box 3120). The portion $c_{ij}$ may be calculated by adding the rounded value of the portion calculated for the immediately preceding cell (i,j-1) and the sum of rounded allocation values $a_{ij}^*$ for all line items apportioned to the account j:

$$c_{ij} = [c_{ij-1}] + \Sigma[a_{1j}^* \text{ through } a_{ij}^*] \quad (6)$$

(box 3120).

Next, the method 3000 may then determine a rounded allocation value $a_{ij}^*$ for those accounts that cannot represent their allocation values precisely (accounts r+1 through n) (box 3070). At a given line i, account j, the method 3000 may determine a total number of shares allocated to accounts 1-j ($d_{dum} = \Sigma[x_1$ through $x_j]$) (box 3130). The method 3000 may determine a relative portion ($c_{ij}$) of the dummy value $a_{dum}$ that should be apportioned to accounts i-j using the equation (4):

$$c_{ij} = a_{dum}^*(x_{dum}/x_{tot}) \quad (4)$$

(box 3140). The rounded allocation value $a_{ij}^*$ for the present cell (i,j) may be calculated using the equation (5) as a difference between the rounded values of the portions calculated for the present cell and the immediately preceding cell (i,j-1) minus the sum of rounded allocation values $a_{ij}^*$ determined for cells (1,j) through (i-1,j):

$$a_{ij}^* = [c_{ij}] - [c_{ij}-1] - \Sigma[a_{1j}^* \text{ through } a_{i-1j}^*] \quad (5)$$

(box 3150). The method 3000 may repeat these operations (boxes 3130-3150) for each of the accounts that cannot represent the allocation values precisely (accounts j=1+r through n). The method 3000 may be repeated for every account of the line item i until it reaches the last line item (line items 1 through m-1).

Finally, the method 3000 may determine the rounded allocation value $a_{mj}^*$ for the last line item (i=m)(box 3080). At the last line item m, account j, the round allocation value may be determined by calculating the difference between the rounded values of the portions [$c_{ij}$] calculated for the present cell and the immediately preceding cell (i,j-1) minus the sum of rounded allocation values $a_{ij}^*$ determined for cells (1,j) through (m-1,j):

$$a_{mj}^* = [c_{mj}] - [c_{mj-1}] - \Sigma[a_{1j}^* \text{ through } a_{m-1j}^*] \quad (7)$$

(box 3160). This operation may be repeated for each and every account j=1 through n (box 3170).

An example may help to understand operation of the method 3000. Consider again the example given in paragraph [22]. If the method 3000 is used, the rounded value of the portion $c_{ij}$ ([$c_{ij}$]) may return the following results:

TABLE 8

| [$c_{ij}$] | | |
|---|---|---|
| 33 | 58 | 99 |
| 66 | 116 | 198 |
| −118 | −50 | −202 |
| 60 | −25 | −102 |
| 0 | 0 | 0 |

These [$c_{ij}$] values may return the following rounded allocation values, $a_{ij}^*$:

TABLE 9

| $a_{ij}^*$: | | |
|---|---|---|
| 33 | 25 | 41 |
| 33 | 25 | 41 |
| −134 | −100 | −166 |
| 33 | 25 | 42 |
| 35 | 25 | 42 |

As shown in Table 9, the rounded allocation value of the cell (5,1) does not equal the cell's original allocation value. Thus, the method 3000 may not always satisfy the Objective 4. Unlike the method 200, however, the method 3000 may satisfy the Objective 4 for all line items except the last line item of the financial balance sheet.

Figure 4A:
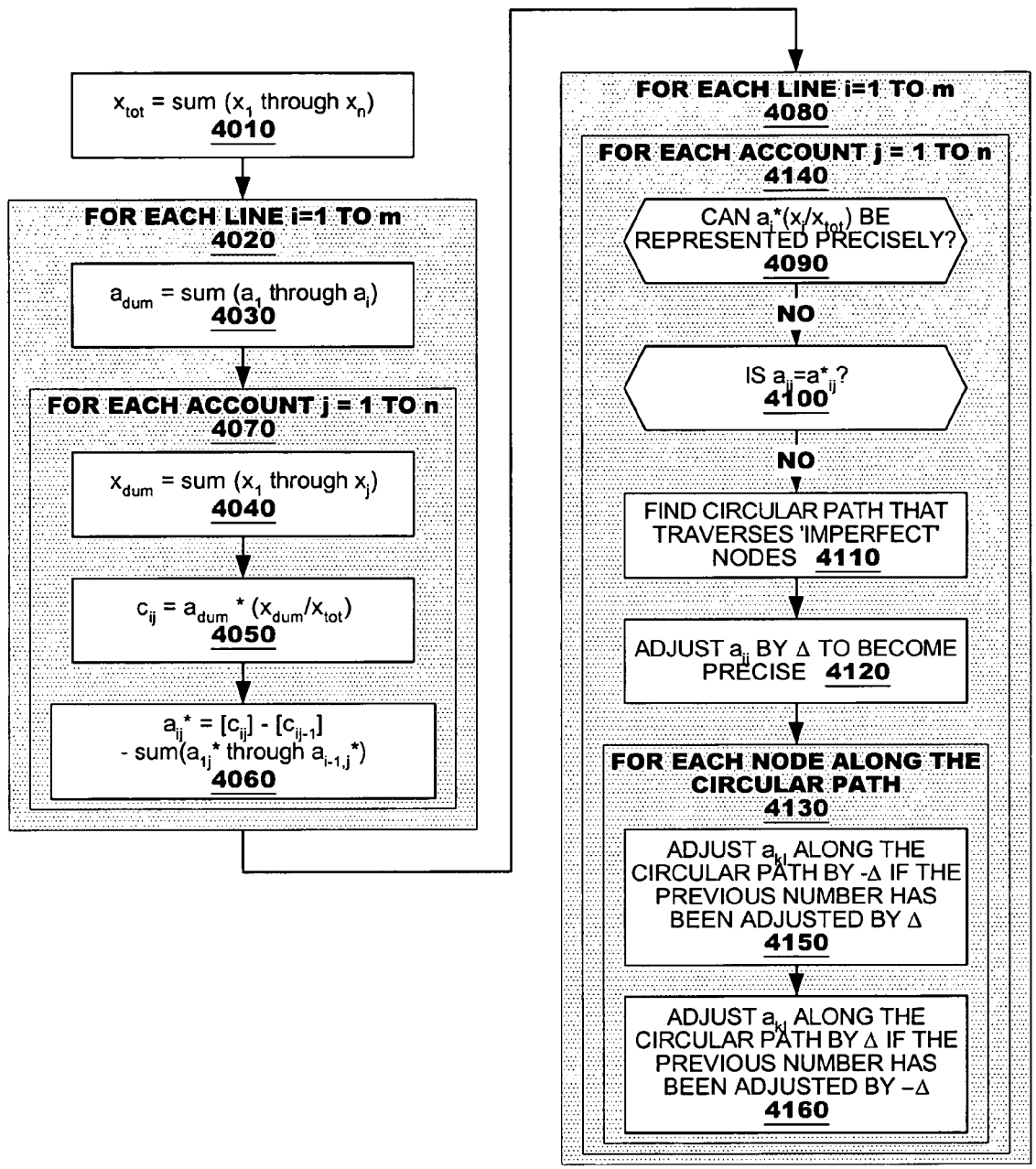
FIG. 4A illustrates a further method for allocating financial statement values across multiple accounts using precise values according to an embodiment of the invention.

FIG. 4A illustrates a fourth method 4000 for allocating a set of line item values ($a_1$-$a_m$) from a financial document across n accounts according to a preferred embodiment of the present invention. The method 4000 creates an n×m array of rounded allocation values ($a_{ij}^*$) that satisfy the Objective 1-3 and the Objective 4 described above. The method 4000 generate rounded allocation values by (1) generating initial rounded allocation values; (2) determining a first cell that does not satisfy the Objective 4; (3) determining a circular path that traverses cells that cannot represent its rounded allocation values precisely; and (4) adjusting the initial rounded allocation values of the first cell and cells along the circular path to satisfy the Objective 4.

When the method 4000 begins, it may determine the initial rounded allocation values. In FIG. 4A, for example, the method 4000 uses the method 200 to determine the initial rounded allocation values. Thus, the method 4000 may determine a total number of shares $x_{tot}$ by adding the number of shares for each and every account of a line item (box 4010).

The method 4000 may generate rounded allocation values by working across a given line item, account by account, then to a next line item. For a given line item i, the method 4000 may determine $a_{dum}$, a running total of line item values for line items 1 through i ($a_{dum}=\Sigma[a_1$ through $a_i]$) (box 4030). At a given line i, account j, the method 4000 may determine $x_{dum}$ representing the total number of shares allocated to accounts 1-j using the same equations mentioned above (box 4040). The method 4000 may then determine a portion ($c_{ij}$) of the total line item values that should be apportion to line items 1-i and accounts i-j. (box 4050) using the equation (4). The rounded allocation value $a_{ij}*$ for the present cell (i,j) may then be calculated using the equation (5) (box 4060). The method 4000 may be repeated for every account of the line item i.

Figure 4B:
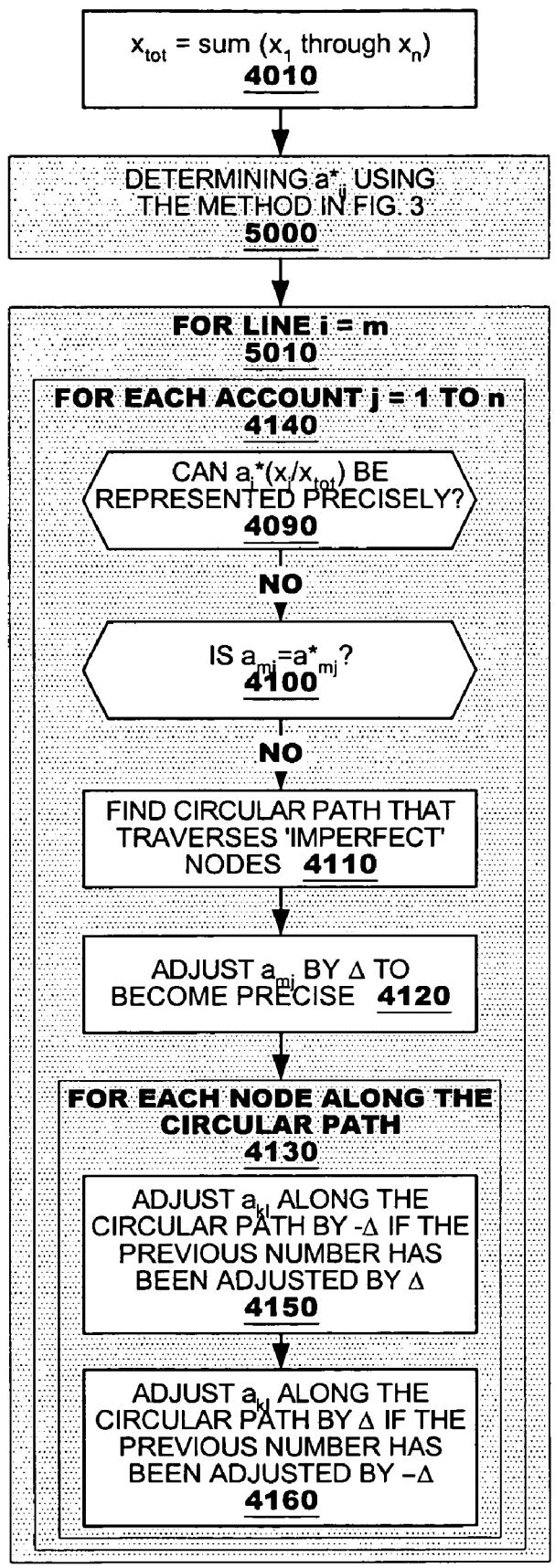
FIG. 4B illustrates another method for allocating financial statement values across multiple accounts using precise values according to an embodiment of the invention.
Figure 4C:
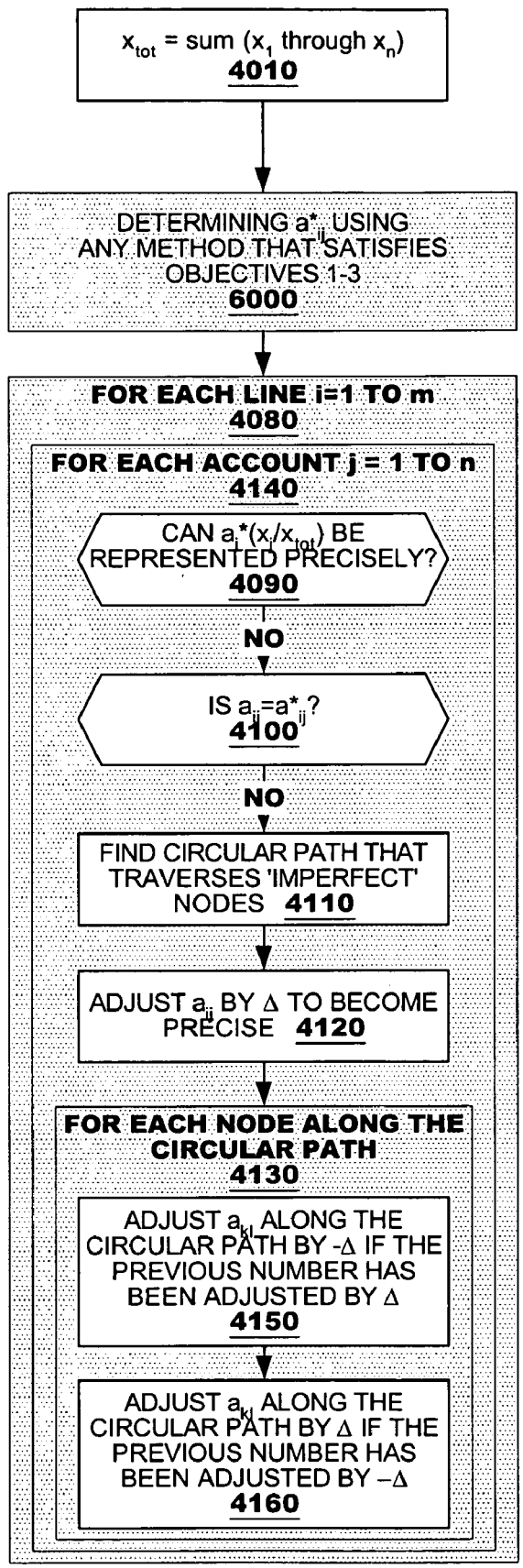
FIG. 4C illustrates a further method for allocating financial statement values across multiple accounts using precise values according to an embodiment of the invention

Alternatively, when the method 4000 begins, it may determine the initial rounded allocation values using the method 3000 illustrated in FIG. 3 (box 5000, FIG. 4B), or any other methods for calculating rounded allocation values that satisfy the Objectives 1-3 (box 6000, FIG. 4C).

When the initial rounded allocation values are determined, the method 4000 may perform adjustments to these values. Thus, at a given line item i, account j, the method 4000 may determine if the allocation value ($a_i*(x_j/x_{tot})$) can be presented precisely without any rounding (box 4090). If not, the method 4000 may determine whether the initial rounded allocation value of the cell (i,j) equals the original allocation value (box 4100). If not, the method 4000 may determine a circular path that traverses "imperfect" nodes, those cells whose allocation values cannot be represented precisely. In determining the circuit path among these imperfect nodes, the method 4000 may use a shortest path algorithm that is commonly known to those skilled in the art. Finding a shortest path is a standard problem of optimization that may be solved using a variety of algorithms. According to an embodiment of the present invention, a "breath-first" search algorithm is used to find the shortest circular path. Other algorithms for finding a shortest path, however, also may be used.

Once the shortest circular path is found, the method 4000 may determine a differential amount ($\Delta$) between the initial rounded allocation value and the original allocation value. The initial rounded allocation value of the cell (i,j), which does not equal its original allocation value, is adjusted by this differential amount (box 4120). The method 4000 may then adjust the initial rounded allocation values of the imperfect nodes along the circular path by the same differential amount (box 4130). Particularly, the initial rounded allocation value of one imperfect node may be adjusted by subtracting the differential amount therefrom if the immediately preceding imperfect node was adjusted by adding the differential amount (box 4150). Alternatively, the initial rounded allocation value of another imperfect node may be adjusted by adding the differential amount thereto if the immediately preceding imperfect node was adjusted by subtracting the differential amount (box 4160).

Typically, the shortest circular path includes the first cell that does not satisfy the Objective 4, a first imperfect node that is located in the same column as the first cell, a second imperfect node that is located in the same row as the first imperfect node, and a third imperfect node that is located in the same column as the second imperfect node. According to embodiments of the present invention, however, the shortest circular path may include as few or many imperfect nodes in various forms/shares as required.

As mentioned previously and shown in FIG. 4B, the method 3000 may be used to determine the initial rounded allocation values instead (box 5000). If so, the method 4000 may only perform the adjustment steps for the last line item because the Objective 4 is satisfied for all line items except the last line item (box 5010). The same method for adjusting the initial rounded allocation values may be used as illustrated in FIG. 4B (boxes 4090-4160).

Again, consider the example given in paragraph [22]. If the method 200 is used, the method 4000 may return the following initial rounded allocation values $a_{ij}*$:

TABLE 10

| $a_{ij}*$: | | | | | |
|---|---|---|---|---|---|
| 33 | | X | 25 | X | 41 |
| 33 | | x | 25 | X | 41 |
| x | −133 | θ | −101 | X | −166 |
| x | 33 | | 25 | X | 42 |
| | 34 | x | 26 | X | 42 |

The cells marked with the symbol "x" represent the imperfect nodes. The cell marked with the symbol "Θ" represents the cell that does not satisfy the Objective 4.

In this example, the circular path determined using the shortest path analysis may be as follows:

$a_{32}* \to a_{52}* \to a_{53}* \to a_{33}*.$

Thus, these cells along the circular path may be adjusted by the differential amount as follows:

Differential amount=$a_{32}*-a_{32}=1$

TABLE 11

| $a_{ij}*$: | | |
|---|---|---|
| 33 | 25 | 41 |
| 33 | 25 | 41 |
| −133 | −101 + 1 | −166 − 1 |
| 33 | 25 | 42 |
| 34 | 26 − 1 | 42 + 1 |

The following table illustrates the result of adjustments:

TABLE 12

| $a_{ij}*$: | | |
|---|---|---|
| 33 | 25 | 41 |
| 33 | 25 | 41 |
| −133 | −100 | −167 |
| 33 | 25 | 42 |
| 34 | 25 | 43 |

If the method 3000 is used, the method 4000 may return the following initial rounded allocation values $a_{ij}*$:

TABLE 13

| $a_{ij}*$: | | | | | |
|---|---|---|---|---|---|
| | 33 | x | 25 | x | 41 |
| | 33 | x | 25 | x | 41 |
| x | −134 | | −100 | x | −166 |
| x | 33 | | 25 | x | 42 |
| θ | 35 | x | 25 | x | 42 |

In this example, the circular path determined using the shortest path analysis may be as follows:

$a_{51}* \to a_{41}* \to a_{43}* \to a_{53}*.$

Thus, these cells along the circular path may be adjusted by the differential amount between the initial rounded allocation value and the original allocation value of the cell (i=3, j=2) as follows:

Differential amount=$a_{51}^{*}-a_{51}=1$

TABLE 14

$a_{ij}^{*}$:

| | | |
|---|---|---|
| 33 | 25 | 41 |
| 33 | 25 | 41 |
| −134 | −100 | −166 |
| 33 + 1 | 25 | 42 − 1 |
| 35 − 1 | 25 | 42 + 1 |

The following table illustrates the result of adjustments:

TABLE 15

$a_{ij}^{*}$:

| | | |
|---|---|---|
| 33 | 25 | 41 |
| 33 | 25 | 41 |
| −134 | −100 | −166 |
| 34 | 25 | 41 |
| 34 | 25 | 43 |

As previously mentioned, in both examples, all conditions: the Objective 1, the Objective 2, the Objective 3, and the Objective 4, are satisfied.

Throughout the foregoing description, examples are provided in the context of a financial balance sheet having five line items and three accounts. These examples have been used based on an expectation that doing so makes it easier to explain the principles of the present invention to a lay audience. The principles of the present invention find application in such embodiments, of course, but it is not so limited. The financial balance sheet may include as few or many line items and accounts as required.

Several embodiments of the present invention are specifically illustrated and described herein. However, it will be appreciated that modifications and variations of the present invention are covered by the above teachings and within the purview of the appended claims without departing from the spirit and intended scope of the invention.

I claim:

1. A method for allocating financial statement values across multiple accounts using precise values, comprising: for a plurality of line item values in the financial statement: iteratively, from a first account to a last account: for a given account j, calculating a relative portion of the line item values to be apportioned to line items 1 to i and accounts 1 to j, rounding the calculated portion according to a predetermined degree of precision, and calculating an allocation portion applicable to the account j by subtracting from the rounded value of the calculated portion for the account j: (1) a rounded value of a calculated portion for a previous account j-1 and (2) a sum of allocation portions applicable to account j of line items 1 to i-i, repeating the iterative process for all line items values in the financial statement; and a computer generating a financial statement based at least in part on the iterative process.

2. The method of claim 1, wherein the relative portion of the line item values to be apportioned to line items 1 to i and accounts 1 to j comprises:
determining a sum of line item values apportion to line items 1 to i;
determining a ratio between a number of relative shares to be apportioned to accounts 1 to j and a number of total shares; and
multiplying the sum of line item values by the ratio.

3. The method of claim 1, further comprising:
for the plurality of line item values in the financial statement:
iteratively, from the first account to the last account:
for a given account, determining if the account is an imperfect node, the imperfect node including the original allocation value that can be represented precisely; if so:
determining a circular path that traverses along the imperfect nodes,
adjusting a first cell by a predetermined differential amount, and
adjusting initial rounded allocation values of the imperfect nodes along the circular path by the predetermined differential amount, and
repeating the iterative process for all line items in the financial statement.

4. The method of claim 3, wherein the imperfect node is found where the initial rounded allocation value equals an original allocation value.

5. The method of claim 3, wherein the predetermined differential amount is a difference between the initial rounded allocation value and the original allocation value.

6. The method of claim 3, wherein the adjusting the initial rounded allocation values of the imperfect nodes further includes:
determining if the previous imperfect node along the circular path has been adjusted by adding or subtracting the differential amount,
if the previous imperfect node was adjusted by adding, adjusting the given imperfect node by subtracting the differential amount from the given imperfect node; and
if the previous imperfect node was adjusted by subtracting, adjusting the given imperfect node by adding the differential amount to the given imperfect node.

7. A computer-readable storage medium encoded with instructions configured to be executed by a processor, the instructions which, when executed by the processor, cause the performance of a method, comprising:
for a plurality of line item values in the financial statement:
iteratively, from a first account to a last account:
for a given account j, calculating a relative portion of the line item values to be apportioned to line items 1 to i and accounts 1 to j, rounding the calculated portion according to a predetermined degree of precision, and calculating an allocation portion applicable to the account j by subtracting from the rounded value of the calculated portion for the account j: (1) a rounded value of a calculated portion for a previous account j-1 and (2) a sum of allocation portions applicable to account j of line items 1 to i-i, repeating the iterative process for all line items values in the financial statement; and
producing a financial statement based at least in part on the iterative process.

8. The computer-readable storage medium of claim 7, wherein the relative portion of the line item values to be apportioned to line items 1 to i and accounts 1 to j comprises:
determining a sum of line item values apportion to line items 1 to i;

determining a ratio between a number of relative shares to be apportioned to accounts 1 to j and a number of total shares; and multiplying the sum of line item values by the ratio.

9. The computer-readable storage medium of claim 7, further encoded with instructions which, when executed by the processor, cause the performance of the method, further comprising:

for the plurality of line item values in the financial statement:

iteratively, from the first account to the last account:

for a given account, determining if the account is an imperfect node, the imperfect node including the original allocation value that can be represented precisely; if so: determining a circular path that traverses along the imperfect nodes, adjusting a first cell by a predetermined differential amount, and adjusting the initial rounded allocation values of the imperfect nodes along the circular path by the predetermined differential amount, and repeating the iterative process for all line items in the financial statement.

10. The computer-readable storage medium of claim 9, wherein the imperfect node is found where the initial rounded allocation value equals an original allocation value.

11. The computer-readable storage medium of claim 9, wherein the predetermined differential amount is a difference between the initial rounded allocation value and the original allocation value.

12. The computer-readable storage medium of claim 9, wherein the adjusting the initial rounded allocation values of the imperfect nodes further includes:

determining if the previous imperfect node along the circular path has been adjusted by adding or subtracting the differential amount, if the previous imperfect node was adjusted by adding, adjusting the given imperfect node by subtracting the differential amount from the given imperfect node; and if the previous imperfect node was adjusted by subtracting, adjusting the given imperfect node by adding the differential amount to the given imperfect node.

* * * * *